US011899152B2

(12) United States Patent
Guillot, III (10) Patent No.: US 11,899,152 B2
(45) Date of Patent: *Feb. 13, 2024

(54) ACOUSTIC RANGING APPARATUS AND METHODS

(71) Applicant: ION Geophysical Corporation, Houston, TX (US)

(72) Inventor: Clement B. Guillot, III, Thibodaux, LA (US)

(73) Assignee: ION Geophysical Corporation, Harahan, LA (US)

( * ) Notice: Subject to any disclaimer, the term of this patent is extended or adjusted under 35 U.S.C. 154(b) by 889 days.

This patent is subject to a terminal disclaimer.

(21) Appl. No.: 16/516,999

(22) Filed: Jul. 19, 2019

(65) Prior Publication Data

US 2019/0377099 A1 Dec. 12, 2019

Related U.S. Application Data

(63) Continuation of application No. 15/288,423, filed on Oct. 7, 2016, now Pat. No. 10,371,845.

(60) Provisional application No. 62/239,702, filed on Oct. 9, 2015.

(51) Int. Cl.
*G01V 1/38* (2006.01)
(52) U.S. Cl.
CPC .......... *G01V 1/3835* (2013.01); *G01V 1/3808* (2013.01)
(58) Field of Classification Search
CPC ............................ G01V 1/3808; G01V 1/3835
See application file for complete search history.

(56) References Cited

U.S. PATENT DOCUMENTS

| 4,635,236 | A | | 1/1987 | Roberts |
| 4,912,682 | A | * | 3/1990 | Norton, Jr ................. G01S 5/30 367/19 |
| 5,031,159 | A | * | 7/1991 | Rouquette ................. G01S 5/30 367/19 |
| 5,142,507 | A | | 8/1992 | Rouquette |
| 5,214,617 | A | | 5/1993 | Rouquette |
| 6,226,601 | B1 | * | 5/2001 | Longaker ................. G01V 1/22 702/14 |
| 7,376,045 | B2 | * | 5/2008 | Falkenberg ............. G01S 15/46 367/19 |
| 8,120,507 | B2 | | 2/2012 | Rouquette et al. |
| 2009/0245019 | A1 | * | 10/2009 | Falkenberg .......... G01V 1/3835 367/19 |
| 2013/0003498 | A1 | | 1/2013 | L'Her et al. |

(Continued)

FOREIGN PATENT DOCUMENTS

WO  WO-0155747 A1 *  8/2001  ........... G01V 1/3835

OTHER PUBLICATIONS

European Examination Report for Application No. 16 784 682.3-1001 dated Nov. 26, 2020.

(Continued)

*Primary Examiner* — Krystine E Breier
(74) *Attorney, Agent, or Firm* — Haynes and Boone, LLP (57) ABSTRACT

A ranging system comprises a plurality of receivers. A plurality of transmitters is configured to generate acoustic or ranging signals over one or more channels. A processor is configured to define a subset of the transmitters within a predefined limited range or listening distance of each receiver. In the subset, the transmitters are configured to generate the acoustic signals over different channels.

25 Claims, 6 Drawing Sheets

(56) References Cited

U.S. PATENT DOCUMENTS

2013/0258807 A1* 10/2013 Erneland .............. G01V 1/3835
367/19
2015/0092516 A1* 4/2015 Frivik .................. G01V 1/3835
367/14

OTHER PUBLICATIONS

International Search Report and Written Opinion dated Jan. 20, 2017 in connection with International Patent Application No. PCT/US2016/056129, 11 pages.
European Patent Office, Commnication Pursuant to Article 94(3) EPC for Application 16 784 682.3—1001 dated Jun. 27, 2022.

* cited by examiner

ACOUSTIC RANGING APPARATUS AND METHODS

CROSS-REFERENCE TO RELATED APPLICATIONS

This application is a continuation of U.S. patent application Ser. No. 15/288,423, ACOUSTIC RANGING APPARATUS AND METHODS, filed Oct. 7, 2016, which claims priority to U.S. Provisional Application No. 62/239,702, ACOUSTIC RANGING APPARATUS AND METHODS, filed Oct. 9, 2015, each of which is incorporated by reference herein, in the entirety and for all purposes.

BACKGROUND

This application relates to acoustic signals and acoustic ranging. More generally, the application is directed to acoustic ranging techniques suitable for use in seismic data acquisition, including, but not limited to, hydroacoustic ranging for marine-based seismic surveys.

Seismic surveys are used to investigate structures beneath the earth's surface, with broad applications in geology and geophysics, oceanography, and even archaeology. Seismic surveys are also important tools for both land-based and marine exploration techniques in the oil and gas industries, utilizing a range of different terrestrial arrays, ocean-bottom sensor nodes, and towed seismic streamers. In marine applications, the streamers each have a number of individual hydrophones or other acoustic receivers, distributed or spaced along the cable length.

Generally, seismic surveys are accomplished by firing air guns or other sources of acoustic or seismic energy, recording the responses of the receivers to subsurface reflections, and processing the data to obtain an image of the corresponding geological formations and other relevant physical structure. In marine surveys, multiple towed streamer cables are typically employed to obtain more detailed three-dimensional seismic data, over shorter periods of time.

Better data can yield more precise and detailed reproductions of the subsurface structure, but accurate receiver positioning is a critical element of the imaging process. Both absolute and relative position information are relevant, including not only source and receiver locations with respect to the subsurface structures of interest, but also distances between the sources and receivers themselves, and among the individual streamer cables and other elements of the array.

Typically, multiple streamer cables are towed behind a vessel in a more or less parallel configuration, with transmitter-to-receiver positioning obtained via acoustic ranging. Individual acoustic pulse transit times are determined from the receiver telemetry provided to a processor or controller (e.g., a navigational controller on the tow vessel), in order to obtain a position solution by converting the transit times into spatial separations.

Typically, a combination of acoustic ranging and radiopositioning are used to complete the determination of source-receiver distances, and to obtain relative positioning with respect to other elements in the array (e.g., distances to the tow vessel or vessels, floats, buoys, and other navigational and geodetic references). Depth sensors, electronic compasses, GPS systems and laser positioning systems are also used, in order to dynamically model the streamer geometry over a range of different towing and environmental conditions.

In large-scale marine surveys, streamer length is a major factor. Towed arrays may be distributed over several square kilometers of surface area, or more. Even where the tow vessel follows a more or less constant heading through the survey field, therefore, environmental factors like wind, waves and currents can have a substantial impact the streamer shape. Variations in tow velocity can also be an issue, as the arrays must sometimes be navigated around coastlines, other vessels, and other navigational hazards.

A complete positioning solution is desired for each shot point in the survey data, including the associated time intervals over which ranging signals are collected. Ideally, the positioning solution should be computed substantially simultaneously with the data collection, before the streamer shape and position can change. For larger arrays with acoustic transmitters and receivers distributed along tens of kilometers of total streamer cable, however, the number of potential acoustic range pairs is enormous, and a complete, idealized and simultaneous solution may be impractical. As a result, there remains a substantial need for more complete acoustic and hydroacoustic ranging techniques, which can provide improved positioning solutions over a wide range of seismic array distance scales, over as short a time window as practical.

SUMMARY

Acoustic ranging systems and methods are disclosed for a plurality of acoustic receivers. A plurality of acoustic transmitters are configured to generate acoustic ranging signals over one or more selected channels. A controller or computer-based processor is configured to define a preselected, limited range or listening distance for each acoustic receiver, with a subset of the transmitters defined within the limited range.

In each subset, the transmitters are configured to generate acoustic signals over different channels. In order to generate position solutions in a short period of time, the acoustic transmitters can be configured to receive and process signals only from selected acoustic transmitters in the subset, within a given limited range, and the acoustic receiver/transmitter distances can be determined without relying on other, later-arriving acoustic signals.

DETAILED DESCRIPTION

Improved acoustic ranging systems and methods provide an acoustic network solution based on available range observations, for which a complete set of possible values can be predefined. Using other known navigation references such as tail buoy position, streamer layback, course made good, etc., the in-water, real-time range observations can be assigned to corresponding predefined (or preconfigured) range values. Changes in the acoustic ranging configuration are not required, even if the acoustic network itself changes shape. Applications include, but are not limited to, towed marine seismic arrays, where the streamer geometry can be subject to a variety of navigational effects.

Figure 1:
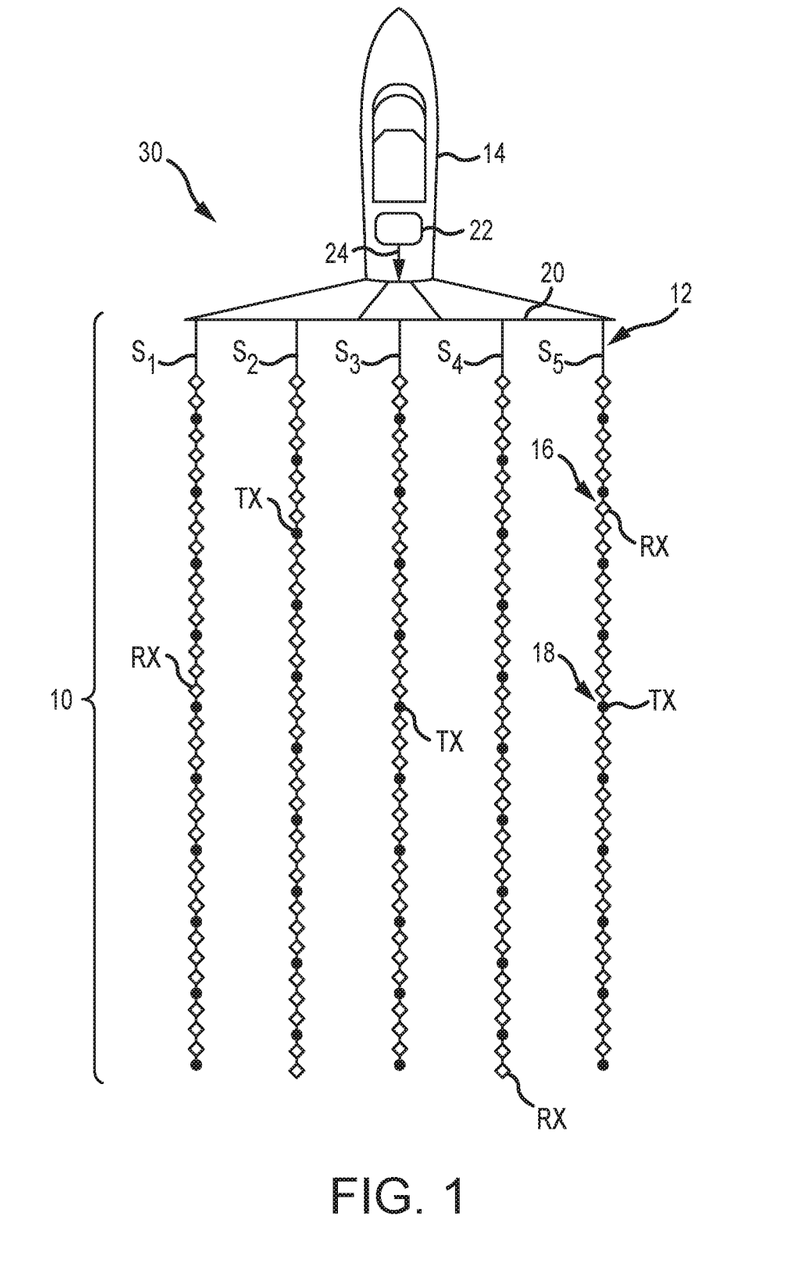
FIG. 1 is a schematic diagram of a seismic array with advanced acoustic ranging.

FIG. 1 is a schematic diagram of a representative seismic array 10, utilizing an advanced acoustic ranging network as described herein. In this particular example, array 10 includes a plurality of individual seismic streamers or streamer cables 12, towed behind a seismic source boat or other vessel 14. Each towed streamer 12 includes a series of hydrophones or acoustic receivers 16 (RX). A plurality of acoustic transmitters or transceivers 18 (TX) are distributed along one or more of the streamer cables.

Streamers 12 are typically deployed using a combination of tow ropes, lead-in cables and separation lines, or a similar tow apparatus 20. While five individual streamers ($S_1$-$S_5$) are shown in FIG. 1, the number may vary (e.g., from one streamer to twelve streamers or more).

A towed air gun array or other seismic source system can also be provided, along with a computer-based control system 22 for coordinating seismic data acquisition from array 10, and to provide advanced positioning solutions for the acoustic receivers 16 on each streamer 12. System 30 includes an array 10 of such streamers 12, in combination with a processor or controller, e.g., computer-based navigational control system 22 on board tow vessel 14. Transmitter/interface 24 can provide for a combination of wired and wireless telemetry and other communications between controller 22 and acoustic receivers 16 on streamers 12, as well as the acoustic transmitters 18, the seismic sources, and the other elements of towed array 10. (See also, e.g., system 30 of FIGS. 2A-4B, with an array 10 of such streamers 12 in combination with an air gun array or other seismic source(s) 32). Separation distances between acoustic transmitter/receiver or transceiver pairs can be determined by acoustic ranging. In one-way ranging, transmitters 18 emit hydroacoustic pulses that travel through the water to acoustic receivers 16. The corresponding spatial separation is directly proportional to the propagation time, and indirectly proportional to the sound velocity in the water (or other medium). In two-way ranging, pulses are exchanged, and the separation is determined from the average propagation time.

Two-way ranging requires acoustic transceivers, rather than transmitter/receiver pairs, but it reduces the need for close clock synchronization, since any fixed timing offset cancels out (at least to first order). Signal processing time can also be substantially increased, however, based on the number of pulses that are exchanged, and there is also more chance of confusion when multiple signals from different sources overlap in time.

Time division multiplexing can address some of these concerns, and the acoustic ranging pulses can also be sent over different channels. But traditional multiplexing schemes can substantially increase the transmission scheduling time, and using different frequencies does not necessarily guarantee positioning accuracy, particularly if the ranging cycle takes so long that the array has moved substantially in the meantime.

A more advanced approach can take a full range of possible acoustic network geometries into account, in order to more effectively match the needs of a particular seismic array. The network geometries and signal exchange protocol can also be more closely coordinated, in order to provide faster and more accurate positioning solutions, adaptable to a wider variety of different seismic array configurations, including configuration that change in real time.

More generally, the acoustic ranging techniques described here provide a more suitable acoustic network solution, based upon the full set of possible range observations that are available. Every potential range in the set is predefined and preconfigured. Using other known navigation references such as tail buoy position, streamer layback, course made good, etc., the real-time, in-water range observations can be assigned to the corresponding preconfigured ranges, in the predefined set.

No changes to the acoustic ranging configuration are necessarily required, even as the acoustic network changes shape. Applications thus include towed marine seismic arrays, where the streamer geometry is subject to changes due to wind, waves, and current effects, as well as changes during deployment, and due to navigation of the array by the towing vessel.

Figure 2A:
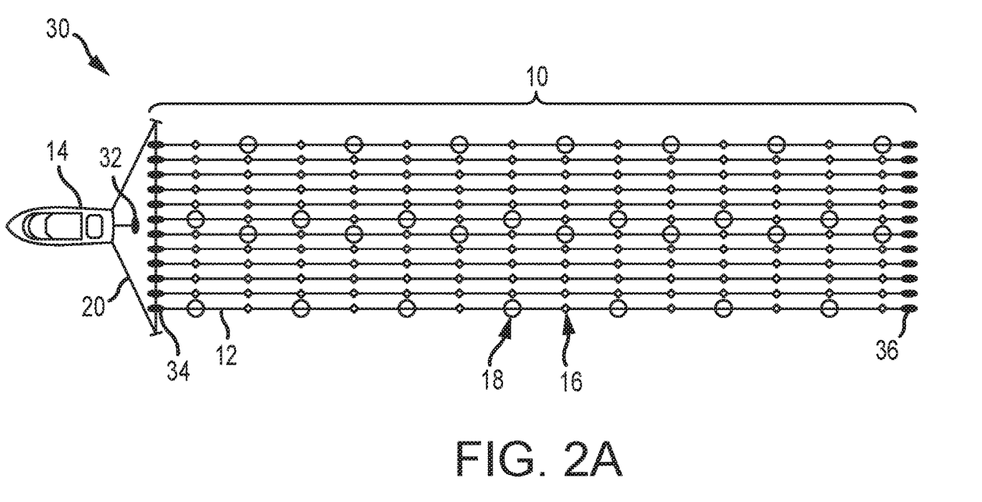
FIG. 2A is a diagram of an acoustic network ranging system for a seismic array.

FIG. 2A is a diagram of an exemplary acoustic network and ranging system 30, for example in a towed seismic array 10 with multiple (e.g., twelve) streamers 12. Streamers 12 are towed by vessel 14, as described above. In this particular configuration, an air gun array or other seismic source 32 is provided. Tow apparatus 20 may also include additional elements, for example head floats 34 forward of each streamer 12, and trailing tail floats or tail buoys 36.

Acoustic system 30 includes an acoustic network made up of hydrophones or other acoustic receivers 16 (shown as diamonds) and acoustic transmitters 18 (shown as circles; neither is to scale). Acoustic receivers 16 are disposed at spaced apart locations along the length of streamers 12, and configured to receive the acoustic signals generated by acoustic transmitters 18. More particularly, each acoustic receiver 16 is operated to receive only acoustic signals from acoustic transmitters 18 within the acoustic receiver's 16 predefined reception region or listening distance, in combination with a corresponding limited receive time window for faster, more accurate acoustic ranging, as described herein.

Acoustic transceivers 16 or 18 can also be used, where individual acoustic receivers 16 and acoustic transmitters 18 are distinguished by operation of the transceiver in either listening (reception) or broadcast (transmission) mode. Individual acoustic receivers 16 and acoustic transmitters 18 can also be physically exchanged or replaced, allowing acoustic network system 30 to take on a wide range of different configurations and geometries, as adapted to the particular requirements of each seismic array 10.

Figure 2B:
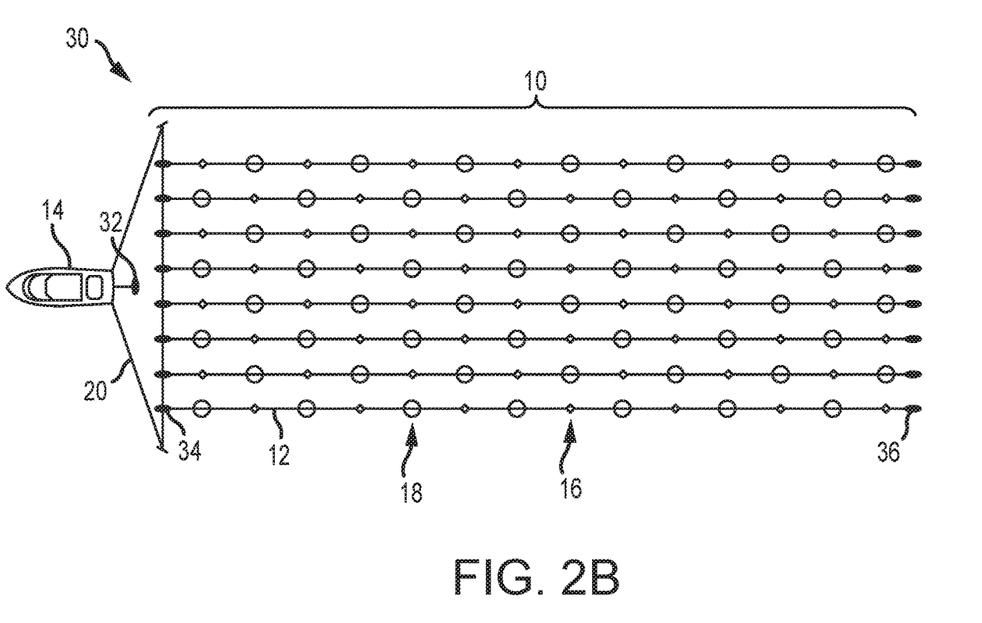
FIG. 2B is a diagram of an acoustic network ranging system for an alternate seismic array.

FIG. 2B is a diagram of acoustic ranging system 30 for an alternate seismic array 10, with eight streamers 12 towed by vessel 14. FIG. 2B represents a relatively less dense seismic streamer configuration that that of FIG. 2B, with relatively greater lateral separation between individual acoustic receivers 16 on each streamer 12.

Acoustic transmitters 18 can be relatively sparsely spaced along streamers 12, as compared to acoustic receivers 16. Conversely, acoustic receivers 16 are relatively densely spaced, as compared to acoustic transmitters 18. Suitable acoustic receiver/transmitter ratios include, but are not limited to, about 5:1, as shown in FIG. 2A, and about 2:1, as shown in FIG. 2B. Alternatively, the acoustic receiver/transmitter ratio may vary, for example about 1:1 (e.g., in an acoustic transceiver configuration), or from about 2:1 or less to about 10:1 or more, depending upon the geometry of seismic array 10, and the desired network configuration of acoustic ranging system 30.

Each acoustic transmitter 18 transmits acoustic ranging signals on one or more of N available channels (e.g., selected from among N=16 channels, or N=32 channels). The different channels can be distinguished by frequency band, modulation, or other suitable coding (e.g., with a channel identifier embedded in each acoustic signal). A synchronization signal can also be provided (e.g., by controller 22), so that all of the active transmitters 18 send the acoustic signals at approximately the same time. Thus, all the acoustic signals in a particular ranging cycle will propagate substantially simultaneously through the water (or other medium).

The synchronization signal can also be used to trigger a predetermined time window or other limited interval for signal reception, corresponding to the propagation time of an acoustic signal received by any of the acoustic receivers 16, from an acoustic transmitter 18 within the preselected listening distance or range. Other acoustic signals received outside the predefined interval may be ignored, as they fall outside the limited listening range.

Acoustic transmitters 18 can thus be configured to respond only to signals received inside the predefined reception time window, or from within the preselected listening range, and to process only these signals for telemetry to the controller. Signals that are not received from within the predefined distance or listening interval can be excluded from the processing, and not included in the telemetry to the controller. Similarly, the processor can be configured to ignore any such signals in the telemetry, and determine the acoustic receiver/transmitter distances using only signals from inside the predefined interval, and within the preselected range. Thus, the positioning solution can be generated without any acoustic signals received from outside the preselected listening distance, that do not fall within the predefined signal receive interval.

The preselected listening range and predefined reception time intervals can be defined system wide, or on a receiver by receiver basis. For example, predefined listening ranges and corresponding reception time intervals can be globally defined for acoustic ranging system 30, or determined for individual acoustic receivers 16, or groups of acoustic receivers 16, e.g., on a particular seismic streamer 12, or in a selected portion of seismic array 10.

In one particular example, all the acoustic transmitters 18 in seismic array 10 send a ranging pulse at substantially the same time (e.g., at $t=t_0$), each using one of the selected channels. Alternatively, a selected subset of acoustic transmitters 18 can be used, e.g., all acoustic transmitters 18 on one or more selected streamers 12 (e.g., the middle streamer or middle two streamers 12 in array 10), or on alternating even and odd-indexed acoustic transmitters 18, or some other subset (e.g., in the front, back, middle and outside portions of array 10).

One or more of the acoustic receivers 16 are typically configured to respond to acoustic ranging signals transmitted on a selected subset of the available channels, for example on an even or odd subset representing eight of sixteen available channels, or sixteen of thirty-two, etc. Additionally or alternatively, one or more of the acoustic receivers 16 can be configured to respond to any signal on any of the available channels, or to respond to signals on fewer than half of the channels.

The acoustic signals obtained by each acoustic receiver 16 are defined by the acoustic signal amplitude and frequency, the layback position of the corresponding acoustic transmitters 18, and the time window allowed for acoustic signal propagation and reception (e.g., based on the known speed of sound in the water or other medium). Thus, a predetermined set of different (limited) listening ranges can be defined for each acoustic receiver 16, and acoustic transmitters 18 within the predefined listening ranges can be identified, based on the signal arrival time and selected channel. Acoustic receivers 16 can also be configured to respond only to signals from acoustic transmitters 18 within the predefined range, for example by defining a limited time interval over which signals are processed (e.g., corresponding to the maximum propagation time for acoustic signals within the predefined range, as described above).

The navigational system on vessel 14 (or a control system 22, see FIG. 1) knows the layback distance of each acoustic receiver 16. More generally, a complete layback diagram can be stored in computer memory, including laybacks for acoustic receivers 16 and acoustic transmitters 18, seismic sources 32, head floats 34, tail buoys 36, the source and streamer towpoints, and other relevant geometry for towed array 10.

Ranges are made up by determining the nearest acoustic transmitter (TX) to receiver (RX) distance, where each acoustic receiver 16 can use information from the acoustic ranging signal (e.g., including arrival time and transmission channel) to identify the nearest acoustic transmitters 18. Additional acoustic transmitters 18 can also be identified, if the ranging signal is sent on an appropriate channel, and arrives within a predefined time interval, from within the predefined listening distance.

Following the synchronization signal, acoustic receivers 16 may thus perform acoustic reception and data processing functions only during the predefined time interval (or receive window). The receive interval corresponds to the transit (or propagation) time of an acoustic signal from an acoustic transmitter located at the outer boundary or limit of each acoustic receiver's reception region (or listening range). At the end of the receive window, the acoustic reception and/or processing functions are terminated, and signals received after the predefined interval are not necessarily processed or included in the telemetry (or other communications with the navigational/ranging controller). Alternatively, the controller can also accept any such data but calculate the positioning solution without it, using only signals received from within the preselected listening range and within the predefined time window, as described above, absent any acoustic signals from outside the listening range or reception window.

Figure 3A:
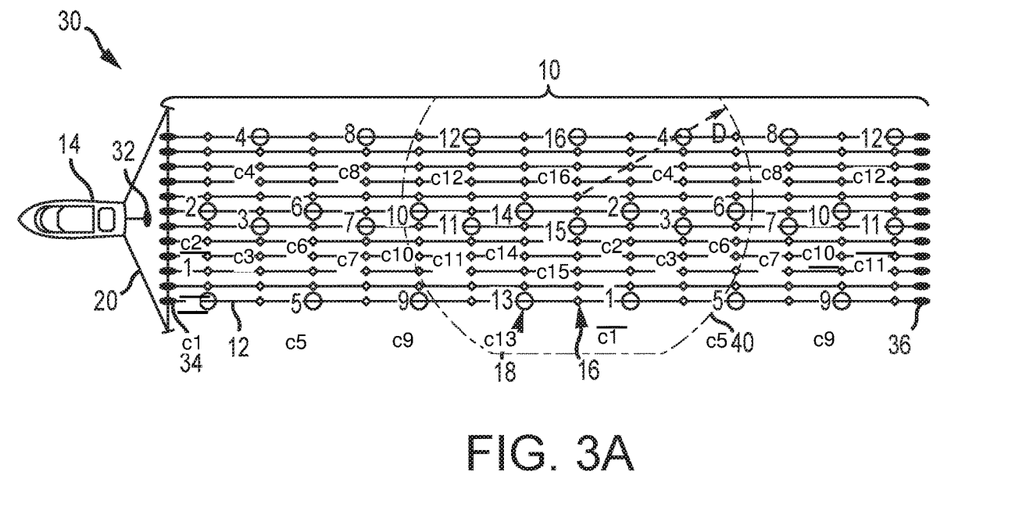
FIG. 3A is an illustration of a representative range ring for an acoustic network.

FIG. 3A is an illustration of a representative range ring 40 for acoustic network and ranging system 30, with limited range or listening distance D. In this example, listening distance D is defined for a relatively dense towed seismic array 10, with relatively low lateral separation between streamers 12 (e.g., as shown in FIG. 2A, above).

The listening range is defined at least in part by determining the nearest acoustic transmitter 18 to each acoustic receiver 16. Generally, listening distance or range D should include at least one or more actively broadcasting acoustic transmitters 18, for each acoustic receiver 16 on an active streamer 12. At the same time, listening distance D can also be limited to reduce the number of acoustic transmitters 18 broadcasting on the same channel, within "hearing" of a particular acoustic receiver 16.

For example, the listening range can be limited so that there is only one acoustic transmitter 18 on each available channel within distance D, or no more than one such acoustic transmitter 18 that broadcasts on each channel or frequency to which each acoustic transmitter 18 responds. As shown in FIG. 3A, for example, the limited range defines a subset of fourteen individual acoustic transmitters 18, each of which is disposed within distance D of a representative acoustic receiver 16.

Each of the fourteen acoustic transmitters 18 within listening distance D of the selected acoustic receiver 16 broadcasts on a different one of the N=16 available channels, some of which are even, and some of which are odd. Thus, the selected acoustic receiver 16 will typically receive seven acoustic signals within the predefined interval, whether it has even or odd polarity (for example, either seven odd channels selected from $c1$, $c3$, $c5$, $c9$, $c7$, $c11$, $c13$ and $c15$, or seven even channels selected from $c2$, $c4$, $c6$, $c8$, $c10$, $c12$, $c14$ and $c16$).

More generally, a suitable range (radius or distance) D can be selected to include a subset of acoustic transmitters 18 operating on at least one and typically one quarter to one half or more of the number of available channels N. Suitable listening distances D are also selected to include no more than one acoustic transmitter 18 on each channel to which a given acoustic transmitter responds. Thus, the subset of transmitters 18 defined by each limited range or reception region will typically number at least one or more, but less than or equal to the total number of available channels N.

Figure 3B:
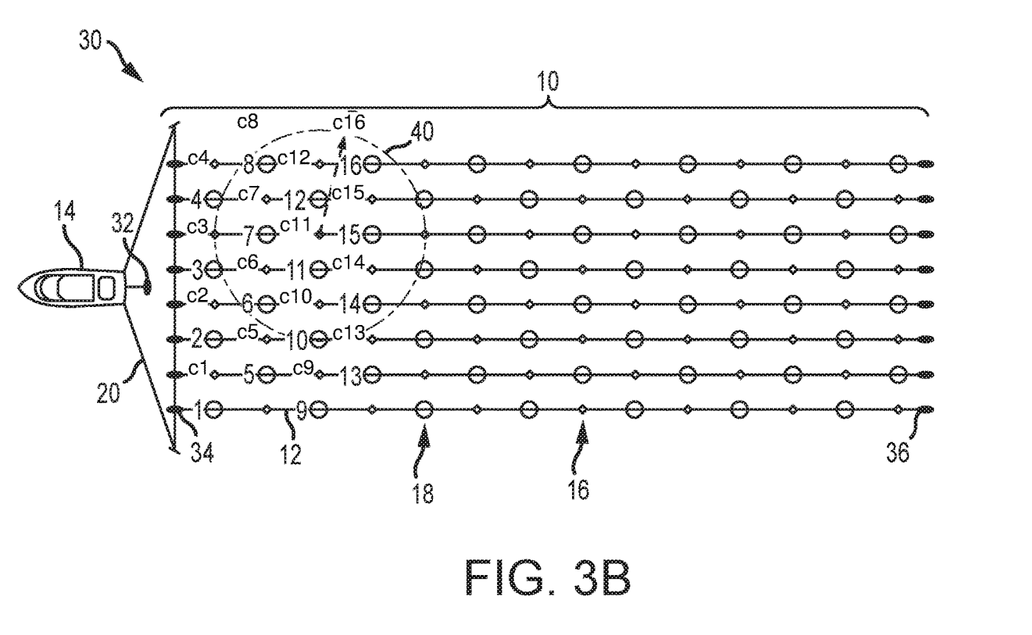
FIG. 3B is an illustration of an alternate range ring for an acoustic network.

FIG. 3B is an illustration of an alternate range ring 40 for acoustic network or ranging system 30. In this example, the limited range (or listening distance) D is defined for a relatively less dense towed seismic array 10, with relatively greater lateral separation between individual streamers 12 (e.g., as shown in FIG. 2B).

As shown in FIG. 3B, suitable listening ranges D vary not only with the density of streamers 12, but also depending on the density of acoustic transmitters 18, based on the number and layback of acoustic transmitters 18 along each individual streamer 12. The navigation/ranging control system knows the layback of the acoustic receivers 16 and acoustic transmitters 18, as described above. Thus, based on the limited listening range of each acoustic receiver 16 and the acoustic transmitter laybacks, listening distance D can be reduced for denser acoustic transmitter configurations, and increased for less dense acoustic transmitter configurations, in order to maintain a suitable number of acoustic transmitters 18 within the listening distance of each acoustic receiver 16, regardless of stringer and array geometry.

The in-water cycle time necessary to complete a positioning solution depends, inter alia, upon the maximum signal propagation time, over the signal reception time window. In one-way ranging, for example, an initial synchronization signal may be transmitted, followed by hydroacoustic ranging signals from individual acoustic transmitters 18 on all the available channels. With an estimated sound speed of about 1500 m/s in seawater, and for a listening range limited to $D \leq 1,000$ m (1 km), the nominal propagation time is less than about 0.7 s. For a listening range limited to $D \leq 600$ m (0.6 km), the nominal propagation time is about 0.4 seconds, or less. If all the acoustic signals are transmitted at substantially the same time, this defines the cycle time for obtaining acoustic ranging data, from which a positioning solution can be derived.

Depending upon array geometry, including streamer lateral separation and acoustic transmitter layback, other suitable listening range limits may vary from about D=100 m (0.1 km) or less for smaller or more densely populated arrays, to about D=2,000 m (2 km) or more for larger and less densely populated arrays. Alternatively, suitable listening ranges may vary up to D=5,000 m (5 km) or more, for very large, sparsely populated arrays. The corresponding receive time windows range from less than a tenth of a second up to a few seconds or more.

Generally, channels are assigned to acoustic transmitters 18 so that no two transmitters operate on the same channel, within a particular separation distance. For suitable listening distances, this allows for subsets of the acoustic transmitters to operate on different channels within the preselected range of a particular acoustic receiver 16, while preventing acoustic transmitters 18 from operating on the same channel, when within the listening range of any one particular (same) acoustic receiver 16. Acoustic transmitters 18 in exclusive subsets, however, can transmit on the same channel, where they are not operating within the listening range of the same acoustic receiver 16.

The broadcast channels for laterally oriented acoustic transmitters 18 can also be indexed in series, for example across alternating streamers 12 as shown in FIG. 3B, or staggered across a number of laterally adjacent streamers 12, as shown in FIG. 3A. In these configurations, only about half of the in-range acoustic transmitters 18 are typically broadcasting on odd channels, and about half are broadcasting on even channels, as described above.

Selective channel response thus reduces the number of observable ranging signals, for each acoustic receiver 16. Alternatively, acoustic receivers 16 could be modified to listen for signals on both even and odd channels, so that they respond to all acoustic transmitters 18 within range. The timing synchronization signal could also include a counter or indexing signal, used to determine the channel response for individual acoustic receivers 16, in each acoustic ranging cycle. Thus, acoustic receivers 16 could also be configured to respond to different sets of in-range acoustic transmitters 18 in successive ranging operations, e.g., alternating between even and odd channels, or cycling sequentially through channels, in order to provide a different basis for successive ranging operations. This approach can improve redundancy in the positioning solution, increasing the number of potential observations by a factor of up to ten or more, and increasing accuracy and reliability in the corresponding acoustic receiver/transmitter separations.

Figure 4A:
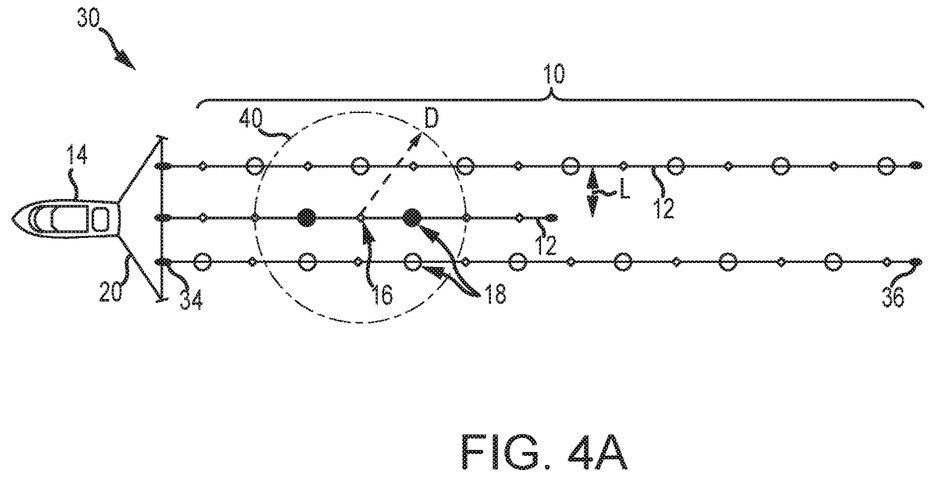
FIG. 4A is a diagram of a range ring for a streamer or seismic cable, shown being deployed within the middle region of a towed seismic array.

FIG. 4A is a diagram illustrating a representative range ring 40 for acoustic receiver 16 on seismic cable streamer 12, shown in deployment within the middle position or inner region of towed seismic array 10, between laterally outer streamer cables 12. In this particular example, middle streamer cable 12 is being deployed by tow vessel 14, e.g., utilizing a tow apparatus 20 as described above.

Figure 4B:
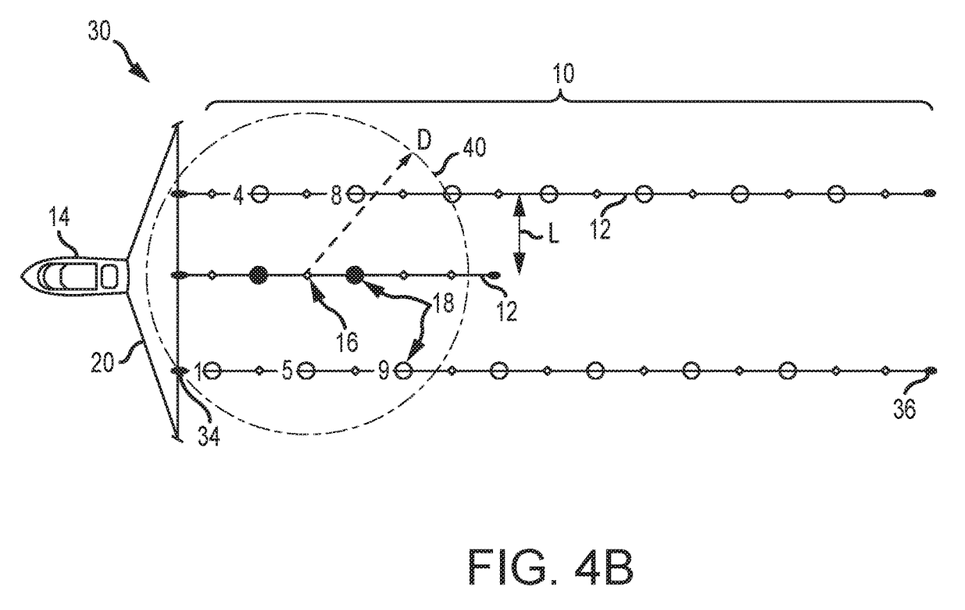
FIG. 4B is a diagram of a range ring for a streamer or seismic cable, shown being deployed within the middle region of an alternate towed array.

FIG. 4B is a diagram illustrating range ring 40 for acoustic receiver 16 on streamer cable 12, shown in deployment within the middle position or inner region of an alternate seismic array 10. As shown in FIG. 4B, the listening distance for acoustic receiver 16 is defined with a relatively higher limited range D, as compared to FIG. 4A, corresponding to the relatively higher lateral spacing L of streamers 12.

Hydroacoustic ranging system 30 thus provides an improved acoustic network solution, based upon the range observations available at a variety of different listening distances, regardless of the current geometry of seismic array 10. Each possible or potential distance D can be predefined by system 30, and real-time, in-water range observations can be assigned to the preconfigured ranges using other known navigation references such as tail buoy position, streamer layback, and course made good. No changes in the ranging configuration are required as the acoustic network change shape, whether due to wind, waves, currents or navigational effects, or during streamer deployment, as shown in FIGS. 4A and 4B.

As another example, the controller could execute an algorithm that uses positioning data and streamer configuration data (e.g., layback diagram data stored in memory plus real-time streamer navigational data) to determine which acoustic transmitters 18 reside within (or are disposed in) the reception region or listening distance D of each respective acoustic receiver 16. The controller could also assign each acoustic receiver 16 to activate only those channels assigned to the acoustic transmitters 18 expected to be within the listening range. As these examples suggest, other possibilities are also included and the spirit and scope of the invention is not to be limited to the particular description of the various versions that are disclosed as examples herein, except as defined by the language of the claims themselves.

Figure 5:
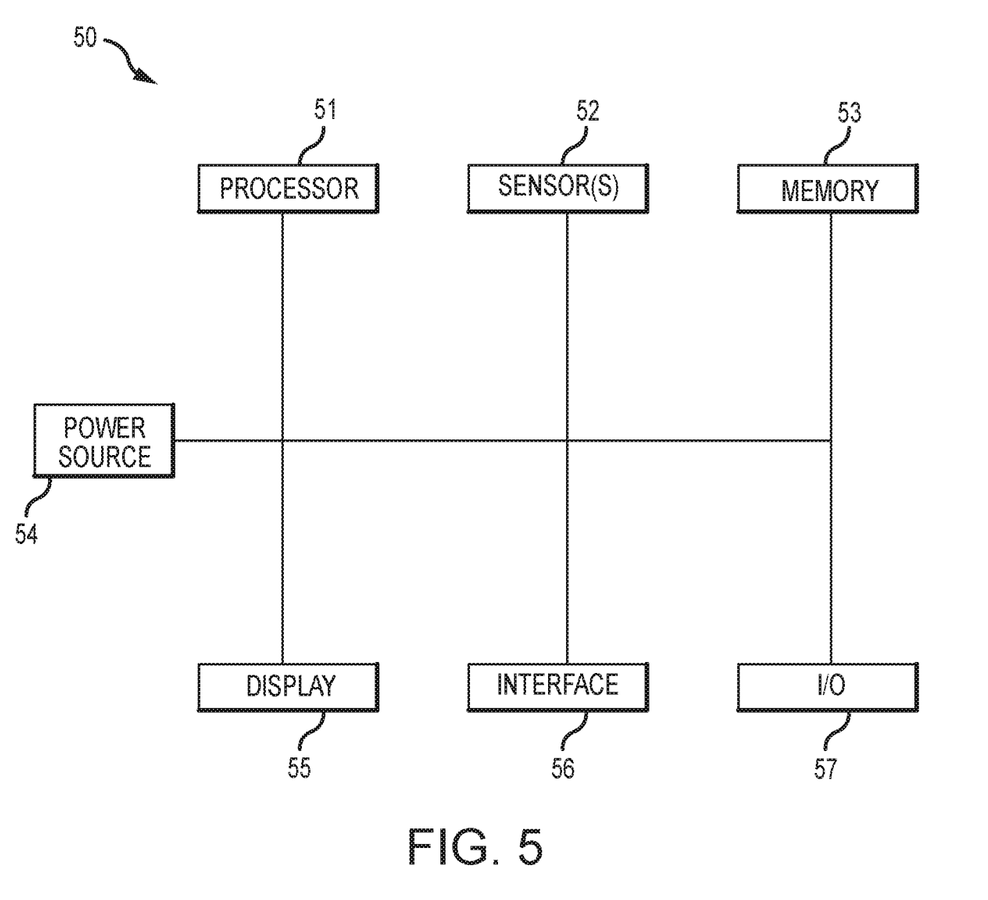
FIG. 5 is a schematic diagram of a controller configured for implementation in the acoustic networking ranging system.

Now turning to FIG. 5, a computer processor or controller 50 can be configured to define a limited listening distance or range for each acoustic receiver. For example, a ranging controller 50 can be used to exchange telemetry and other data with the acoustic transmitters and receivers, including memory for storing a layback diagram describing the acoustic transmitter and receiver positions along the streamers, in combination with navigational data describing tow positions, buoy and float positions, course made good, etc.

FIG. 5 is a schematic diagram of a controller 50 that can be implemented in an acoustic networking ranging system 30. As shown in FIG. 5, controller 50 includes one or more processors 51, sensors 52, memory components 53, power sources 54, displays 55, interfaces 56, and input/output devices 57. In some embodiments, the controller 50 comprises or is comprised within a navigational controller 22, as represented in FIG. 1.

The one or more electronic processors 51 utilized by controller 50 are configured for processing, receiving, and/or transmitting instructions for acoustic ranging applications, as described herein. For example, individual processors 51 typically include microprocessor or microcomputer components executing software code stored on non-transitory computer-readable media, where the code is executed according to the acoustic ranging techniques described herein.

The processor 51 may include more than one individual processing component. For example, a first processing element 51 may control a first set of components 52-57 of the controller system 50, and one or more second and other processing elements 51 may control other sets of the controller components 52-57. The processing elements 51 can operate independently or in coordinated fashion, and may or may not communicate data and instructions with one another. Additionally, each processor 51 can be configured to execute instructions in series or in parallel. The individual processors 51 and other selected elements 52-57 of controller 50 may also be distributed along the streamer or seismic cable components, for example among the acoustic receivers, transmitters and/or transceivers, or on another elements such as a head float or tail buoy. In some applications, controller 50 can also utilize one or more cloud-based processors 51 and other components 52-57, utilizing a combination of hard-wired, acoustic, and wireless links for communication.

The one or more sensors 52 can be adapted provide substantially any type of suitable input to controller 50. The type, number, and location of the one or more sensor 52 may also vary as desired, depending on the desired functions of the acoustic ranging system for which controller 50 is adapted. For example, sensors 52 may include acoustic receivers and transceivers and other seismic survey system components, as described herein.

Memory 53 stores electronic data utilized by the controller 50. For example, the memory 53 may store data in electronic or magnetic form, or using other data storage techniques. The memory 53 may include, for example, non-volatile or non-transitory machine-readable data storage components, volatile or transitory storage components, a magnetic storage medium, optical storage medium, magneto-optical storage medium, read only memory, random access memory, erasable programmable memory, flash memory, or a combination thereof.

Display 55 provides a visual output for the controller 50. The display 55 may be configured with any suitable size and can be positioned substantially anywhere on or within the controller apparatus 50. In some embodiments, display 55 is interactive, and on other embodiment controller 50 does not necessarily include a display 55.

Data interface 56 transmits and receives data being communicated with the controller 50. In some embodiments, data interface 56 comprises or is comprised within an interface 24 in communication with a navigational system, as shown in FIG. 1. The data interface 56 may transmit data to and receive data from an acoustic ranging network, as described herein, including acoustic receivers 16 and/or transmitters 18 distributed along a seismic cable or streamer, and/or other computing devices. For example, suitable data interfaces 56 may transmit data to and from other computing devices through a wireless network (e.g., acoustic, optical, WiFi, Bluetooth, cellular network, etc.), or a wired network (e.g., Ethernet or other dedicated network system), or using a combination thereof. As a specific example, one or more data interfaces 56 can be configured to allow a suitable controller 50 to communicate with acoustic receivers 16 and/or transmitters 18 for coordinating acoustic ranging and seismic data acquisition for a number of streamers 12 or other seismic array 10, as described herein. Data interface 56 may also translate messages, instructions and other data for the controller 50, using a format that adapted for the acoustic receivers 16 and/or transmitters 18 to transmit and receive.

Input/output (I/O) interface 58 allows the controller 50 to receive input from and provide output to a user or external control system. For example, I/O interface 56 may include a keyboard, touch screen, mouse, stylus, or the like, with or without a display 55. The configuration of the devices that interact via I/O interface 58 may be varied as desired, depending upon application. In some embodiments, the controller 50 does not necessarily include distinct display 55 and I/O interface components 58.

Controller 50 also includes a power source 54, in order to provide power to the various other controller components 51-53 and 55-57. The power source 54 may include one or more rechargeable, disposable, or hardwire sources, e.g., batteries, line power, power supplies, or the like. Additionally, suitable power sources 54 may include one or more adapters, connectors or similar elements that provide different types of power to the various components of controller 50. In some embodiments, the power source 54 is adapted for use with a serial bus or similar connections that provide power to the various controller components, and can also transmit data and instructions for communication via I/O interface 58, and for communication to and from the acoustic receivers 16, transmitters 18 and other components of a seismic cable or seismic array via data interface 56.

The components of the controller 50 can also be distributed over such an array 10, as described above, e.g., distributed among the acoustic receivers 16 and/or transmitters 18, and/or using one or more remote network or cloud-based processor components in communication with controller 50 via interface 56.

Figure 6:
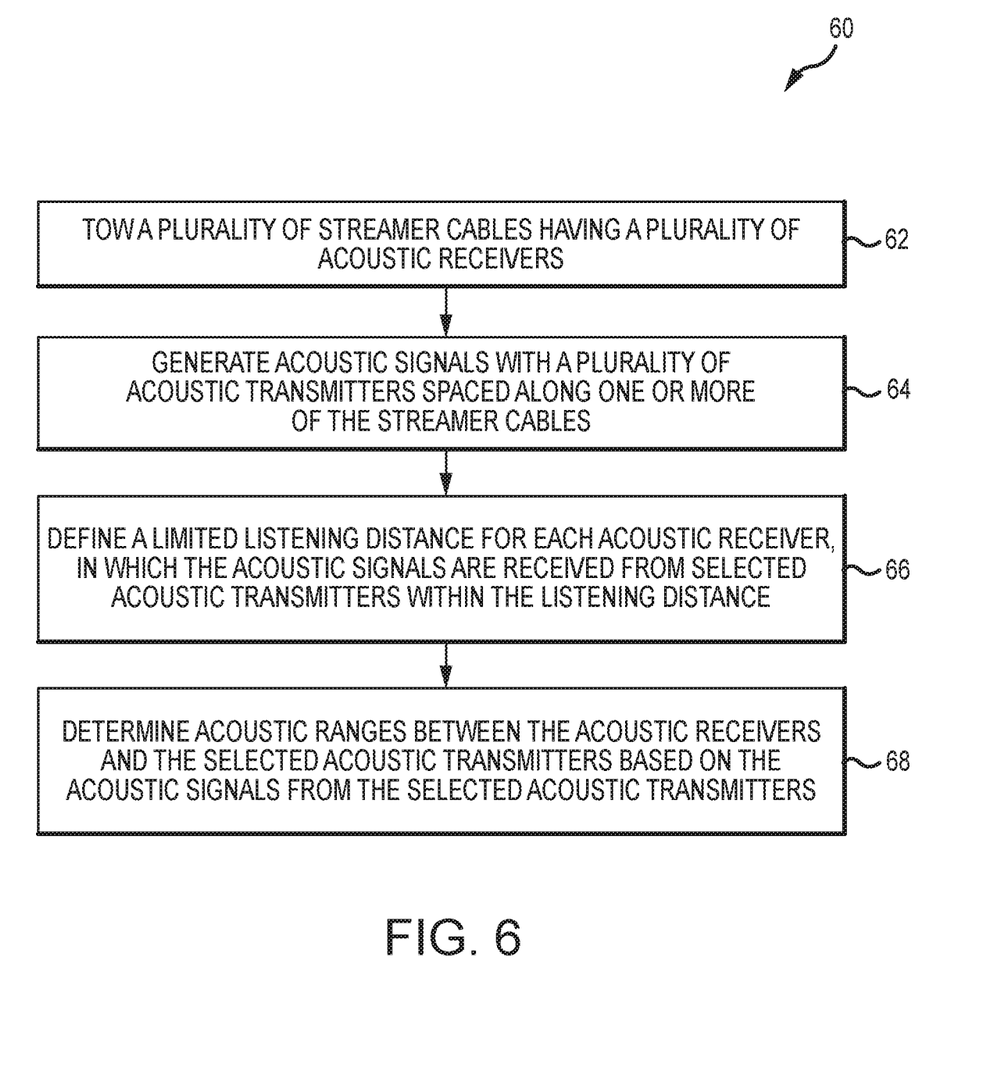
FIG. 6 is a flow chart illustrating a method for determining acoustic ranges between acoustic receivers and selected acoustic transmitters.

FIG. 6 is a flow chart illustrating a method 60 for determining acoustic ranges between acoustic receivers and selected acoustic transmitters. As shown in FIG. 6, method 60 includes one or more steps of towing or otherwise deploying a streamer or other seismic cable (step 62), generating signals with one or more acoustic transmitters or receivers (step 64), defining a range or "listening distance" for the acoustic receivers (step 66), and deterring acoustic ranges between the transmitters and receivers based on the acoustic signals (step 68).

In step 62 (towing or deployment), a plurality of streamer cables 12 having a plurality of acoustic receivers are deployed and towed in order to conduct a seismic survey, for example by a seismic vessel 14 as describe herein. More generally, suitable acoustic receivers, transmitters and/or transceiver components can be deployed along any suitable seismic cable, or along a set of seismic cables in a seismic array.

In step 64 (signal generation), acoustic signals are generated by a plurality of acoustic transmitters 18 spaced along one or more of the streamers 12. The acoustic receivers and transmitters can either be provided as distinct components, or in the form of acoustic transceivers.

In step 66, a limited listening distance is defined for each acoustic receiver 16, in which the acoustic signals are received from selected acoustic transmitters 18 within a defined listening distance. The listening distance can also be described as a signal acquisition limit, where signals generated within the defined distance of a particular acoustic receiver or transceiver are included, and utilized for ranging, while signals generated outside the defined distance are excluded, and not utilized for ranging.

In step 68, a controller 22 or 50 determines the acoustic ranges between the acoustic receivers 16 and the acoustic transmitters 18, based on the acoustic signals from the selected acoustic transmitters 18. For example, the acoustic ranges may be determined based only on the acoustic signals received from the selected acoustic transmitters within the limited listening distance, which are included in the ranging analysis, absent acoustic signals received from outside the listening distance, which are excluded from the ranging analysis.

The acoustic ranges can also be are determined based only on the acoustic signals received within a time window defined for propagation of the acoustic signals over the limited listening distance, absent acoustic signals received outside the time widow. A synchronizing signal can be generated for each of the acoustic transmitters, in order to generate the acoustic signals in the same, network-wide transmission interval, where the acoustic signals from different transmitters propagate substantially simultaneously over the limited listening distance. Different channels can also be assigned to each of the selected acoustic transmitters or transceivers within the limited listening distance, where the selected acoustic components transmit the acoustic signals over the different channels.

EXAMPLES

An acoustic ranging system may include a plurality of streamers and a plurality of acoustic receivers disposed along the streamers, each acoustic receiver configured to receive acoustic signals, e.g., for seismic data acquisition and acoustic ranging. A plurality of acoustic transmitters can be disposed along one or more of the streamers, each acoustic transmitter configured to generate the acoustic signals over one or more of a plurality of available channels.

A computer processor or controller can be configured to define a limited listening distance or range for each acoustic receiver. For example, a ranging controller can be used to exchange telemetry and other data with the acoustic transmitters and receivers, including memory for storing a layback diagram describing the acoustic transmitter and receiver positions along the streamers, in combination with navigational data describing tow positions, buoy and float positions, course made good information, and other navigational and positional data for the array of streamers.

A subset of the acoustic transmitters can be defined within the limited range, where each acoustic transmitter in the subset is configured to generate the acoustic signals over a different one of the channels. The acoustic receivers can then be configured to respond only to signals received from acoustic transmitters within the limited range.

For example, the processor can be configured to generate a positioning solution for the streamers based only on the acoustic signals received by each acoustic receiver from the corresponding subset of acoustic transmitters, within the limited range or listening distance. Similarly, the processor can determine acoustic ranges between each of the acoustic receivers and selected acoustic transmitters in the corresponding subsets, based only on the acoustic signals received by the acoustic receivers from an acoustic transmitter within the limited distance thereof. Thus, the acoustic ranges can be determined without or absent of any acoustic signals received from acoustic transmitters that are outside the preselected range.

In any of the above examples and embodiments, the acoustic transmitters can be configured to generate the acoustic signals over the same transmission interval, e.g., using a synchronization pulse generated by the controller. Thus, the acoustic ranging cycle time of the system can be substantially determined by the propagation of the acoustic signals over the limited range. For example, the limited range or preselected range can be defined based on either the lateral spacing of the streamers, the layback of the acoustic transmitters, or both. The limited distance can also define each of the subsets with acoustic transmitters generating the acoustic signals over different channels, while acoustic transmitters in exclusive subsets generate the acoustic signals over at least one same channel.

In any of the above examples and embodiments, the acoustic receivers can be configured to process only acoustic signals received over a limited time interval corresponding to propagation of the acoustic signals over the limited range. Each of the acoustic receivers can be configured for receiving the acoustic signals generated in any of the channels, or to process only the acoustic signals received over channels assigned to acoustic transmitters within the limited range.

In method embodiments, a plurality of streamers or seismic cables can be deployed in a seismic array, e.g., towed behind a seismic source boat or other vessel. Each cable includes a plurality of acoustic receivers spaced along the cable length. Acoustic signals are generated with a plurality of acoustic transmitters, which are spaced along one or more of the cables.

A limited range or listening distance is defined for each acoustic receiver, where the acoustic signals are received from selected acoustic transmitters within the listening distance. Acoustic ranges are determined between the acoustic receivers and the selected acoustic transmitters, based on the propagation time of the acoustic signals from the selected acoustic transmitters to the acoustic receivers, within the listening distance.

In any of the above examples and embodiments, the acoustic ranges can be based only on the acoustic signals received from the selected acoustic transmitters within the listening distance, absent acoustic signals received from outside the listening distance. Similarly, the acoustic ranges can also be determined based only on the acoustic signals received within a time window defined for propagation of the acoustic signals over the listening distance, absent acoustic signals received outside the time widow.

In any of the above examples and embodiments, a synchronizing signal can be generated for each of the acoustic transmitters, e.g., via telemetry or using a wireless signal from the acoustic ranging controller. The synchronizing signal can be configured to trigger the acoustic transmitters to generate the acoustic signals in the same transmission interval, so the acoustic signals from different transmitters propagate substantially simultaneously over the listening distance. Different channels can be assigned to each of the selected acoustic transmitters within the listening distance, where the selected acoustic transmitters transmit the acoustic signals over the different channels.

In any of the above examples and embodiments, a minimum separation can be defined between acoustic transmitters assigned to the same channel, where any acoustic transmitters within the minimum separation of one another are assigned different channels. Thus, only acoustic transmitters outside the minimum separation from one another may be assigned to the same channel.

Ranging system embodiments include a plurality of towed streamers or other seismic cables, e.g., in a marine seismic array. A plurality of receivers is disposed along the towed streamers, each receiver configured to receive ranging signals. A plurality of transmitters is disposed along one or more of the streamers, each transmitter configured to generate the ranging signals over one or more selected channels.

A processor or computer-based ranging controller is configured to determine distances between the receivers and the transmitters, based on propagation of the ranging signals from the transmitters within a limited range of each receiver. Each transmitter within the limited range is configured to generate the ranging signals over a different one of the selected channels, and the distances between the receivers and transmitters can be determined based only on the ranging signals received within a time interval defined by propagation of the signals over the limited range, absent any signals received from transmitters outside the time interval. In seismic array applications, the limited range can be based on lateral spacing of the streamers, the layback of the transmitters, or both.

In any of the above examples and embodiments, the processor or controller can be configured to generate a synchronization signal, in order for the transmitters to generate the ranging signals at approximately the same time, so that the signals propagate substantially simultaneously over the limited range. The synchronization signal can also be configured for the receivers to process the ranging signals received over different channels on successive transmissions thereof, where the distances on the successive transmissions are determined between the receivers and the transmitters configured to generate the ranging signals over the different channels.

More specifically, a system is disclosed comprising a plurality of streamers, a plurality of acoustic receivers disposed along the streamers, each configured to receive acoustic signals, and a plurality of acoustic transmitters disposed along one or more of the streamers, each configured to generate the acoustic signals over one or more of a plurality of channels. A processor is configured to define a limited range for each acoustic receiver, where a subset of the acoustic transmitters is defined within the limited range thereof, and where each acoustic transmitter in the subset is configured to generate the acoustic signals over a different one of the channels.

In some embodiments, the processor is further configured to generate a positioning solution based only on the acoustic signals received by each acoustic receiver from the corresponding subset of acoustic transmitters within the limited range. In particular examples, the processor is configured to determine acoustic ranges between each acoustic receiver and selected acoustic transmitters in the corresponding subsets, based only on the acoustic signals received by the acoustic receivers from an acoustic transmitter within the limited range thereof.

In any of these examples and embodiments, the acoustic ranges can determined absent acoustic signals received from acoustic transmitters outside the limited range. Depending on application, the acoustic transmitters can be configured to generate the acoustic signals over a same transmission interval, such that an acoustic ranging cycle time of the system is substantially determined by propagation of the acoustic signals over the limited range.

The limited range can be defined based on at least one of lateral spacing of the streamers or a layback of the acoustic transmitters. In particular examples, the limited range defines each of the subsets with acoustic transmitters generating the acoustic signals over different channels, where acoustic transmitters in exclusive subsets generate the acoustic signals over at least one same channel.

In any of these examples and embodiments, the acoustic receivers can be configured to process only acoustic signals received over a time interval corresponding to propagation of the acoustic signals over the limited range. In particular examples, each of the acoustic receivers is configured for receiving the acoustic signals generated in any of the channels. In additional examples, the acoustic receivers are further configured to process only the acoustic signals received over channels assigned to acoustic transmitters within the limited range.

A method is disclosed comprising the steps of towing a plurality of streamer cables, each streamer cable having a plurality of acoustic receivers spaced along a length thereof, generating acoustic signals with a plurality of acoustic transmitters spaced along one or more of the streamer cables, and defining a limited listening distance for each acoustic receiver, where the acoustic signals are received from selected acoustic transmitters within the listening distance. Acoustic ranges are determined between the acoustic receivers and the selected acoustic transmitters based on propagation time of the acoustic signals from the selected acoustic transmitters to the acoustic receivers, within the listening distance.

In some embodiments, the acoustic ranges are based only on the acoustic signals received from the selected acoustic transmitters within the limited listening distance, absent acoustic signals received from outside the listening distance. In particular examples, the acoustic ranges are determined based only on the acoustic signals received within a time window defined for propagation of the acoustic signals over the limited listening distance, absent acoustic signals received outside the time widow.

In any of these examples and embodiments, the method may further include generating a synchronizing signal for each of the acoustic transmitters to generate the acoustic signals in a same transmission interval, where the acoustic signals from different transmitters propagate substantially simultaneously over the limited listening distance. In particular examples, the method further includes assigning different channels to each of the selected acoustic transmitters within the limited listening distance, where the selected acoustic transmitters transmit the acoustic signals over the different channels. In additional examples, the method further includes defining a minimum separation between acoustic transmitters assigned to a same channel, where any acoustic transmitters within the minimum separation of one another are assigned to different channels, and only acoustic transmitters outside the minimum separation from one another are assigned to the same channel.

A ranging system is also disclosed. The ranging system includes a plurality of towed streamers, a plurality of receivers disposed along the towed streamers, each configured to receive ranging signals, and a plurality of transmitters disposed along one or more of the streamers, each configured to generate the ranging signals over one or more selected channels. A processor or controller is configured to determine distances between the receivers and the transmitters based on propagation of the ranging signals from the transmitters within a limited range of each receiver, where each transmitter within the limited range is configured to generate the ranging signals over a different one of the selected channels.

In any of these examples and embodiments, the distances between the receivers and the transmitters can be determined based only on the ranging signals received within a time interval defined by propagation of the ranging signals over the limited range, absent any ranging signals received outside the time interval. In particular examples, the limited range is based on one or more of a lateral spacing of the streamers and a layback of the transmitters, and further comprising the processor configured to generate a synchronization signal for the transmitters, such that the ranging signals propagate substantially simultaneously over the limited range. In additional examples, the synchronization signal can be configured for the receivers to process the ranging signals received over different channels on successive transmissions thereof, such that the distances are determined on the successive transmission between the receivers and the transmitters configured to generate the ranging signals over the different channels.

While this invention has been described with reference to exemplary embodiments, it will be understood by those skilled in the art that various changes can be made and equivalents may be substituted without departing from the spirit and scope thereof. Modifications may also be made to adapt these teachings to other applications and to particular problems, technologies, and materials, without departing from the essential scope thereof. The invention is thus not limited to the particular examples that are disclosed, but encompasses all embodiments falling within the scope of the appended claims.

The invention claimed is:

1. A system comprising:
a plurality of acoustic receivers configured to receive acoustic signals; and
a plurality of acoustic transmitters, wherein each of the acoustic transmitters is configured to transmit a ranging pulse on a respective one of the acoustic signals, over one of a plurality of channels; and
a processor configured to define a respective predefined limited range for each of the acoustic receivers, wherein a subset of the acoustic transmitters is defined within the respective predefined limited range thereof, and wherein each acoustic transmitter of the respective subset is configured to transmit the ranging pulse on the respective acoustic signal over a different one of the plurality of channels;
wherein, during an acoustic ranging cycle, the plurality of acoustic transmitters are each configured to initiate transmission of the ranging pulses on the respective acoustic signals at a substantially same time, such that propagation of the ranging pulses on each of the acoustic signals is substantially simultaneous;
wherein the plurality of acoustic receivers are each configured to detect the ranging pulses transmitted by the respective subset of the acoustic transmitters within a time window defined by the respective predefined limited range; and
wherein a cycle time of the acoustic ranging cycle starts with initiation of transmission of the ranging pulses on the respective acoustic signals by each of the acoustic transmitters at the substantially same time, and ends upon expiration of the time window defined by a longest of the respective pre-defined limited ranges.

2. The system of claim 1, wherein the processor is further configured to generate a positioning solution based only on the ranging pulses on the acoustic signals received by each of the acoustic receivers from the respective subset of the acoustic transmitters within the respective predefined limited range.

3. The system of claim 1, wherein the processor is configured to determine acoustic ranges between each of the acoustic receivers and selected acoustic transmitters in the respective subset of the acoustic transmitters, based only on the acoustic signals received by each of the acoustic receivers from an acoustic transmitter of the respective subset of the acoustic transmitters within the respective predefined limited range.

4. The system of claim 3, wherein the acoustic ranges are determined absent acoustic signals received from acoustic transmitters outside the predefined limited range.

5. The system of claim 1, wherein the respective predefined limited range is defined based on at least one of lateral spacing or a layback of the plurality of acoustic transmitters.

6. The system of claim 1, wherein each of the acoustic receivers is configured to process acoustic signals received within the time window corresponding to propagation of the acoustic signals over the respective predefined limited range.

7. The system of claim 1, wherein each of the acoustic receivers is configured to receive acoustic signals generated in any of the channels.

8. The system of claim 7, wherein the plurality of acoustic receivers are further configured to process only acoustic signals received over channels assigned to acoustic transmitters within the respective predefined limited range.

9. A method comprising:
defining a respective limited listening distance for each acoustic receiver in each of respective pluralities of acoustic receivers, wherein each acoustic receiver in each of the respective pluralities of acoustic receivers is configured to receive acoustic signals from selected acoustic transmitters spaced within the respective listening distance thereof; and
during an acoustic ranging cycle:
providing a synchronizing signal to each of the acoustic transmitters and to each acoustic receiver in each of the respective pluralities of acoustic receivers;
in response to receipt of the synchronizing signal, initiating transmission of a ranging pulse on a respective acoustic signal from each of the acoustic transmitters at a substantially same time, wherein the ranging pulses transmitted on each of the respective acoustic signals propagate substantially simultaneously; and
in response to receipt of the synchronizing signal, substantially simultaneously determining for each acoustic receiver a respective acoustic range to the selected acoustic transmitters within the respective listening distance, based on propagation time of the ranging pulses on the respective acoustic signals from the selected acoustic transmitters;
wherein a cycle time of the acoustic ranging cycle starts with initiation of transmission of the ranging pulses on the respective acoustic signals by each of acoustic transmitters at the substantially same time, and ends upon expiration of a time window defined by a longest of the respective limited listening distances.

10. The method of claim 9, wherein the acoustic range to the selected acoustic transmitters within the respective listening distance is based only on the ranging pulses on the acoustic signals received from the respective selected acoustic transmitters within the respective limited listening distance, absent acoustic signals received from other acoustic transmitters outside the respective limited listening distance.

11. The method of claim 10, wherein the acoustic ranges are determined based only on the ranging pulses received within a time window defined for propagation of the acoustic signals over the respective limited listening distance, absent receipt of the ranging pulse on acoustic signals outside said time widow.

12. The method of claim 9, further comprising assigning different channels to each of the selected acoustic transmitters within the respective limited listening distance, wherein the selected acoustic transmitters transmit the ranging pulses on the respective acoustic signals over the different channels.

13. The method of claim 12, further comprising defining a minimum separation distance between acoustic transmitters assigned to a same channel, wherein each of the selected acoustic transmitters within the minimum separation distance of one another are assigned different channels, and wherein some acoustic transmitters outside the minimum separation distance from one another are assigned a same channel.

14. A ranging system comprising:
a plurality of receivers configured to receive ranging signals;
a plurality of transmitters configured transmit ranging signals over a plurality of channels; and
a processor configured to determine distances between each of the receivers and a subset of the transmitters within a predefined limited range thereof, based on propagation of the respective ranging signals from the subset of the transmitters within the respective predefined limited range of each receiver;
wherein each transmitter in the subset of transmitters within the respective predefined limited range is configured to generate the respective ranging signal over a different one of the plurality of channels; and
wherein, during an acoustic ranging cycle and in response to receipt of a synchronization signal, the plurality of transmitters are each configured to initiate transmission of the respective ranging signals at a substantially same time, such that propagation of the respective ranging signals is substantially simultaneous;
wherein each of the receivers is configured to detect the ranging signals within a time window defined by the respective predefined limited range; and
wherein a cycle time of the acoustic ranging cycle starts with initiation of transmission of the respective ranging signals by each of the transmitters at the substantially same time, and ends upon expiration of the time window defined for a longest of the respective predefined limited ranges.

15. The system of claim 14, wherein the distances between each of the receivers and each of the respective subset of the transmitters are determined based on the ranging signals received from the respective subset of the transmitters within a time interval defined by propagation of the respective ranging signals over the predefined limited range associated with the receiver, absent any other ranging signals received outside the time interval.

16. The system of claim 14, wherein the predefined limited range for each of the receivers is based on one or more of a lateral spacing and a layback of the plurality of transmitters, and further comprising the processor configured to generate a synchronization signal for the plurality of transmitters, such that all of the respective ranging signals in the acoustic ranging cycle propagate substantially simultaneously over the respective predefined limited ranges for each of the receivers.

17. The system of claim 2, wherein the processor is further configured to generate the positioning solution to determine a distance between at least one of the plurality of acoustic receivers and a float or a buoy.

18. The system of claim 2, wherein the plurality of acoustic receivers are disposed along a streamer, the system further comprising at least one head float or tail buoy disposed along the streamer, wherein the processor is configured to generate the positioning solution to determine a distance between at least one of the plurality of acoustic receivers and the at least one head float or tail buoy.

19. The system of claim 2, wherein the processor is configured to generate the positioning solution to determine a distance between at least one of the plurality of acoustic receivers and a vessel.

20. The system of claim 19, wherein at least one of the plurality of acoustic receivers is towed by the vessel.

21. The method of claim 9, further comprising generating a positioning solution to determine a distance between at least one of acoustic receiver of the respective pluralities of acoustic receivers and a float or a buoy.

22. The method of claim 21, wherein the at least one acoustic receiver and the float or buoy are disposed along a streamer.

23. The method of claim 21, wherein the at least one acoustic receiver is towed by a vessel and further comprising generating another positioning solution to determine a distance between the at least one acoustic receiver and the vessel.

24. The system of claim 14, further comprising at least one float or buoy, wherein the processor is configured to generate a positioning solution to determine a distance between at least one of the plurality of receivers and the float or a buoy.

25. The system of claim 14, wherein the processor is configured to generate a positioning solution to determine a distance between at least one of the plurality of receivers and a vessel towing the at least one receiver.

* * * * *